United States Patent

Nicklas et al.

[11] Patent Number: 5,787,877
[45] Date of Patent: Aug. 4, 1998

[54] SOLAR ENERGY CONCENTRATING SYSTEM HAVING A NOVEL FOCAL COLLECTION ZONE

[76] Inventors: Michael H. Nicklas, 1237 Gatehouse Dr., Cary, N.C. 27511; Louis J. Gerics, 804 Sasser St., Raleigh, N.C. 27604

[21] Appl. No.: 379,842

[22] Filed: Jan. 26, 1995

[51] Int. Cl.[6] .................................. F24J 2/38
[52] U.S. Cl. .................. 126/601; 126/600; 126/692; 126/685; 126/696; 126/693
[58] Field of Search ............... 126/600, 589, 126/684, 688, 692, 693, 694, 601

[56] References Cited

U.S. PATENT DOCUMENTS

| | | | |
|---|---|---|---|
| 3,868,823 | 3/1975 | Russell, Jr. et al. | 126/600 X |
| 3,994,279 | 11/1976 | Barak | 126/693 X |
| 3,994,435 | 11/1976 | Barr | 126/693 X |
| 4,149,521 | 4/1979 | Miller et al. | 126/693 |
| 4,291,679 | 9/1981 | Kersavage | 126/621 |
| 4,309,984 | 1/1982 | Darbeck | 126/599 |
| 4,359,265 | 11/1982 | Winston | 126/438 X |
| 4,459,972 | 7/1984 | Moore | 126/600 |
| 4,579,106 | 4/1986 | Townsend et al. | 126/621 X |

*Primary Examiner*—Larry Jones

[57] ABSTRACT

The present invention relates to an improved solar energy concentrating system having a novel focal collection zone. In general, the system comprises a moveable solar energy collector supported above a cylindrically arcuate solar energy concentrating reflector. Instead of positioning the collector to rotate about the center of curvature of the reflector and to extend down halfway between the center of curvature and the reflector, in the present invention, the solar energy collector extends further down according to a particular algorithm.

6 Claims, 2 Drawing Sheets

SOLAR ENERGY CONCENTRATING SYSTEM HAVING A NOVEL FOCAL COLLECTION ZONE

TECHNICAL FIELD

The present invention relates to an improved solar energy concentrating system having a novel focal collection zone. In general, the system comprises a moveable solar energy collector supported above a cylindrically arcuate solar energy concentrating reflector. Instead of positioning the collector to rotate about the center of curvature of the reflector and to extend down halfway between the center of curvature and the reflector, in the present invention, the solar energy collector extends further down according to a particular algorithm.

BACKGROUND ART

In the past, solar energy concentrating systems have used a variety of approaches for achieving a maximum collection of solar energy from a combination of a cylindrically arcuate concentrating reflector and a movable solar energy collector. One traditional configuration is to pivot the collector about the center of curvature for the reflector. The collector is placed on a rotating member that extends down from the center of curvature. The length of that member extends up to one half the radius of curvature of the reflector.

Another setup is shown in U.S. Pat. No. 3,868,823. A moveable collector is disclosed in combination with a reflector comprised of a plurality of linear surfaces. The solar energy collector pivots about the center of curvature for the multiple element reflector, extending up from the center of curvature a distance equal to the radius of curvature.

SUMMARY OF THE INVENTION

The present invention relates to an improved solar energy concentrating system with a greater solar collection efficiency. All the elements of the present invention may have been used in the prior art. The novelty of the present improvement lies in the unexpected benefits in changing the relationship among the elements, in particular between a solar collector and a cylindrically arcuate solar energy concentrating reflector.

In the present invention, a reflector has a concave and cylindrically arcuate configuration of up to 180 degrees, a lower edge, an upper edge and curved lateral edges. (For the purposes of this invention, "lower" and "upper" do not express, necessarily, a relative position between the edges. For example, if the reflector has a 180 degrees configuration, then these edges may be equidistant from a supporting surface for the reflector.) The skyward surface of the reflector is the concave surface. A structural support means is disposed beneath the reflector. It is dimensioned and configured to support the weight of at least the reflector, a solar energy collector, and a collector support means. A collector support means spans across the reflector, from the upper edge to the lower edge. The collector support means is connected to a solar energy collector and either the reflector, the structural support means, or a supporting surface that underlies the structural support means. The collector support means is dimensioned and configured so to support a solar energy collector and allow it to move arcuately so as to stay within a focal collection zone.

A solar energy collector extends lengthwise across the reflector, from one curved lateral edge to another curved lateral edge. The collector is located by and disposed on the collector support means so as to move arcuately within a predetermined focal zone for collecting solar energy reflected from the reflector. The collector is dimensioned and configured to receive reflected solar energy into a conduit through which an energy transfer fluid can flow. Also included in the present invention is a means for positioning the collector. Connected to the collector support means, the positioning means places the collector in an optimal position within the focal collection zone for collecting solar energy throughout a defined solar cycle, such as the diurnal cycle. The final element is a fluid transport means which connects the conduit to a thermal energy use means or an energy storage means. When the sun shines, fluid is heated while in the conduit of the collector, and the fluid transport means circulates the heated fluid through the thermal energy use means or the energy storage means.

The improvement of the present invention comprises the collector pivoting about the center of curvature of the reflector, while the collector is located down from the center of curvature by a distance L plus or minus 5% according to the formula: $L=(R*1.1)/2$; where R equals the radius of the curvature of the solar energy concentrating reflector. By using such a position, one can achieve a greater accumulation of reflected solar energy than at previous known locations, including the prior art mounting of the collector at the halfway position.

PREFERRED EMBODIMENTS

Figure 1:
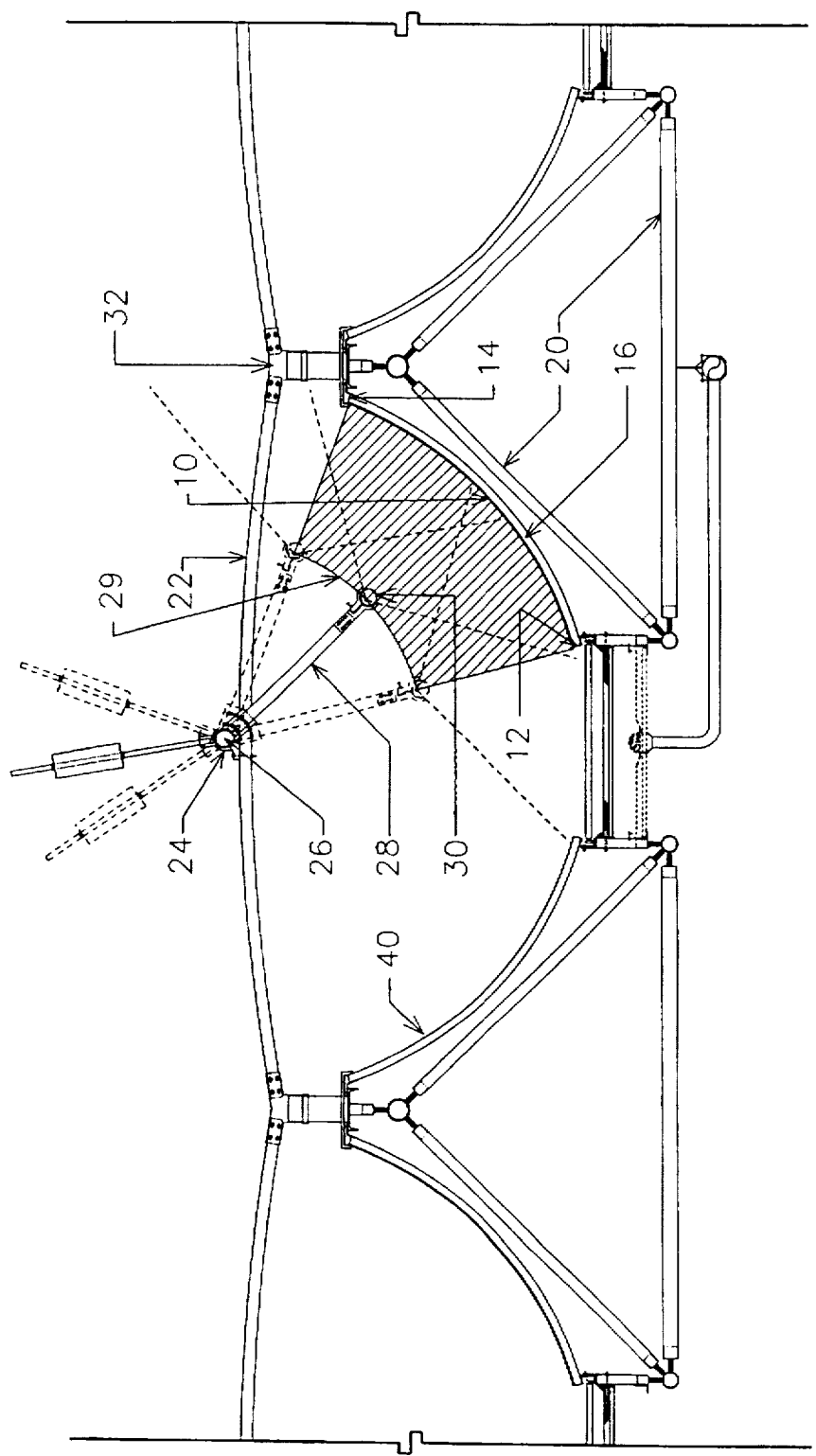
FIG. 1 is a sectional view of the present invention.
Figure 2:
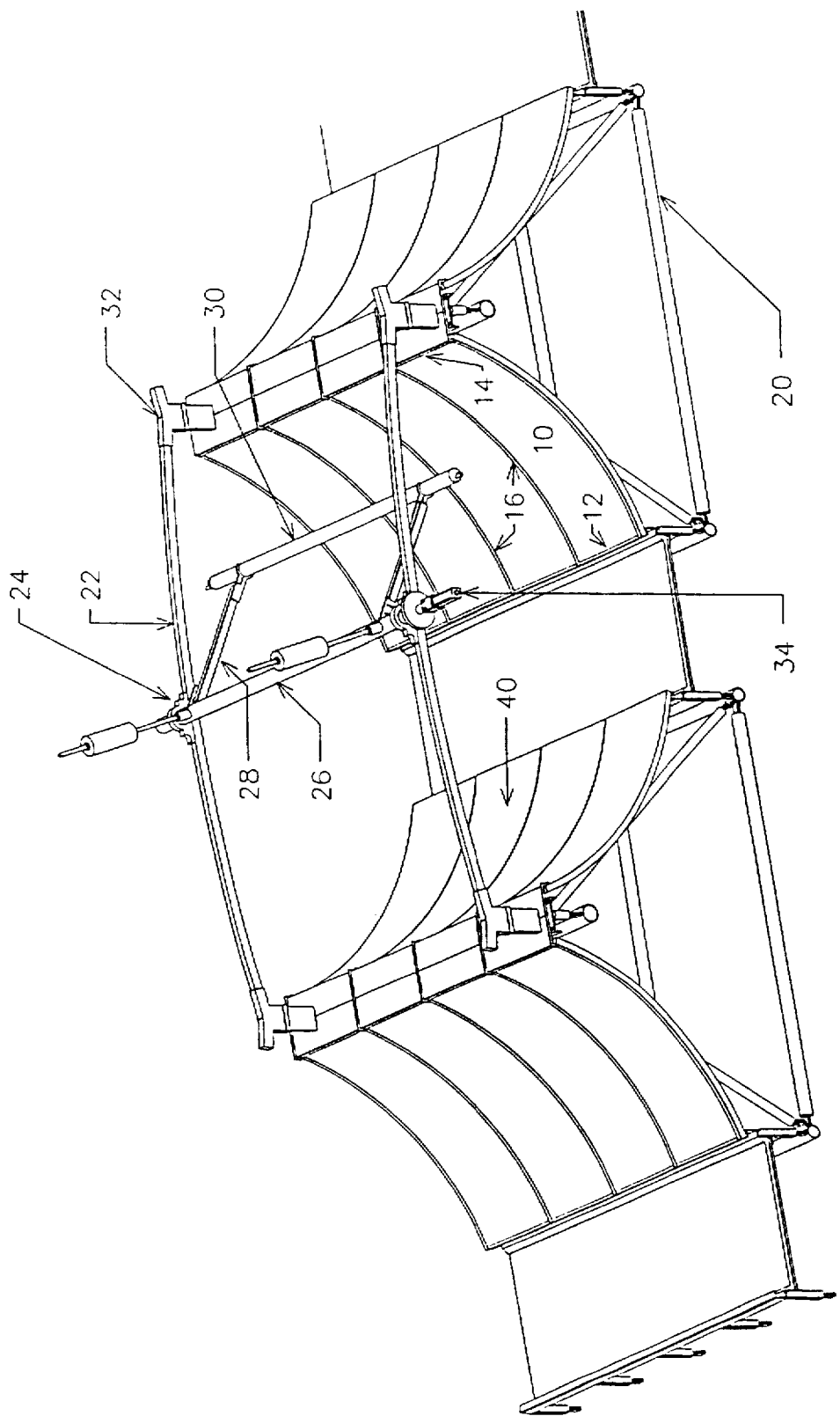
FIG. 2 is an isometric view of the present invention.

A preferred embodiment of the present invention is shown in FIG. 1. A solar energy concentrating reflector (10) having a concave and cylindrically arcuate configuration of about 60 degrees has a lower edge (12), an upper edge (14), and curved lateral edges (16). Suitable materials for the reflector include polished metals or reflectorized materials having deposited or laminated coatings. In one preferred embodiment, the reflector comprises an ultraviolet-stabilized plastic or polymer having a reflectorized surface of aluminum deposited thereon. The skyward surface of the reflector is the concave surface. In another preferred embodiment, a first reflector can be adjacent to a second reflector, either along its curved lateral edges or its lower edge. In the latter case, the lower edge of a first reflector is adjacent along the entire lower edge to the lower edge of a second reflector, each reflector having a cylindrically arcuate configuration of up to 90 degrees, the pair forming a cylindrically arcuate configuration of up to 180 degrees.

A structural support means (20), such as a space truss, is disposed beneath the reflector. The structural support means is dimensioned and configured to support the weight of at least the reflector, a solar energy collector, and a solar energy collector support means, as well as conventional live loads and dead loads. A number of alternative configurations can be designed by those of ordinary skill in the art. A collector support means spans lengthwise across and above the reflector, as defined by the axis extending from the upper edge (14) to the lower edge (12). The collector support means comprises two arches (22), a bearing means (24) disposed on each arch, a drive shaft member (26) connected to the bearing means (so as to comprise a rotating means), and two downward spacing members (28). The rotating means is located at the center of curvature for the reflector, as shown by the circular path (29) in FIG. 1. The downward spacing members are dimensioned such that the collector is located down from the center of curvature by a distance L plus or minus 5% according to the formula:

$$L=(R*1.1)/2;$$

where R equals the radius of the curvature of the reflector. The above arrangement of elements allows the collector to move within a predetermined and defined focal zone for collecting solar energy reflected from the reflector.

The solar energy collector (30) is connected to the structural support means (20) by the collector support means. Attachment points (32) are located adjacent to both the upper edges and the lower edge of the reflector, the attachment points also being connected to the arches (22). Alternatively, the collector support means could have been connected to a supporting surface that underlies the structural support means. The collector support means is dimensioned and configured so to support the collector and allow it to move arcuately, and thus, alternative designs are known to those of ordinary skill in the art.

In some preferred embodiments, the collector is oriented lengthwise within 30 degrees of a true East-West axis, such as in the embodiment shown in FIG. 1. However, if the non-reflective panel (40) in FIG. 1 is replaced with a reflector, then one could orient the collector lengthwise within 30 degrees of a true North-South axis.

A means for positioning the solar energy collector (34) is connected to the drive shaft member (26). The positioning means can comprise a number of conventional means including a hydraulic motor driven by a hydraulic pump and control means, an electrical step motor, or a mechanical chain/gear or cable/pulley means. In any of these forms, the positioning means keeps the collector in an optimal position for collecting solar energy throughout a defined solar cycle, preferably the diurnal cycle. Thus, a microprocessor can be part of the positioning means, calculating periodically the optimal solar energy gathering position according to an algorithm that takes into account the latitude, the time of year, and the time of day. Such algorithms are known to those of ordinary skill in the art.

The collector is dimensioned and configured to receive reflected solar energy into an interior conduit through which an energy transfer fluid can flow. Preferred embodiments of collectors for cylindrically arcuate reflectors are disclosed in U.S. Pat. No. 5,274,497. Suitable fluids include commercially available heat transfer fluids. A fluid transport system, not shown, connects the conduit of the collector to a thermal energy use means or a thermal energy storage means. The fluid transport means circulates the solar energy-heated fluid. The fluid transport means can be of conventional designs known to those of ordinary skill in the art.

All publications or unpublished patent applications mentioned herein are hereby incorporated by reference thereto.

Other embodiments of the present invention are not presented here which are obvious to those of ordinary skill in the art, now or during the term of any patent issuing from this patent specification, and thus, are within the spirit and scope of the present invention.

We claim:

1. An improved solar energy concentrating system having:

a) at least one solar energy concentrating reflector having a concave and cylindrically arcuate configuration of up to 180 degrees, a lower edge, an upper edge, and curved lateral edges, the skyward surface of the reflector being the concave surface;

b) a structural support means disposed beneath and attached to the reflector, said support means being dimensioned and configured to support the weight of at least the reflector, a solar energy collector, and a collector support means;

c) a collector support means spanning across and above the reflector, said collector support means being connected to a solar energy collector and either the structural support means or a supporting surface that underlies the structural support means, and said collector support means being dimensioned and configured so as to support the solar energy collector and allow it to move arcuately;

d) a solar energy collector extending laterally across the reflector, said collector being located and disposed so as to move within a predetermined focal zone for collecting reflected solar energy from the reflector, and said collector being dimensioned and configured to receive the reflected solar energy into a conduit through which an energy transfer fluid flows, said fluid being heated by the reflected solar energy;

e) a means for positioning the collector in an optimal position within the focal collection zone throughout a defined solar cycle, said positioning means being connected to the collector support means; and f) a fluid transport means which connects the conduit of the collector to a thermal energy use means or an energy storage means, wherein the fluid transport means circulates the solar energy-heated fluid through the conduit;

wherein the improvement comprises the collector pivoting about the center of curvature of the reflector, and the collector being located down from the center of curvature by a distance L plus or minus 5% according to the formula:

$$L=(R*1.1)/2;$$

where R equals the radius of the curvature of the solar energy concentrating reflector.

2. The solar energy concentrating system of claim 1 wherein the positioning means is controlled by a microprocessor which periodically calculates an optimal position within the focal collection zone for the collector to receive the reflected solar energy from the reflector.

3. The solar energy concentrating system of claim 1 wherein the collector is oriented lengthwise within 30 degrees of a true East-West axis.

4. The solar energy concentrating system of claim 1 comprising two reflectors, wherein a first reflector is adjacent along the entire lower edge to the lower edge of a second reflector, each reflector having a cylindrically arcuate configuration of up to 90 degrees.

5. The solar energy concentrating system of claim 1 wherein the collector support means includes at least two collector support members, each being disposed at either end of the collector.

6. The solar energy concentrating system of claim 4 wherein the collector is oriented lengthwise within 30 degrees of a true North-South axis.

* * * * *